July 1, 1969  Y. E. STAHLER ET AL  3,453,629
BEAM SPLITTING DIPOLE ARRAY
Filed Nov. 15, 1966  Sheet 1 of 2

INVENTORS
Y. E. STAHLER
J. H. STEVENS
BY Harry A. Herbert Jr
ATTORNEY
James S. Shannon
AGENT INVENTORS
Y. E. STAHLER
J. H. STEVENS
BY Harry A. Herbert Jr
ATTORNEY
James S. Shannon
AGENT

United States Patent Office 3,453,629
Patented July 1, 1969

3,453,629
BEAM SPLITTING DIPOLE ARRAY
Ylo E. Stahler, Dayton, Ohio, and John H. Stevens, Indianapolis, Ind., assignors to the United States of America as represented by the Secretary of the Air Force
Filed Nov. 15, 1966, Ser. No. 594,585
Int. Cl. H01q *19/06*
U.S. Cl. 343—754            6 Claims

ABSTRACT OF THE DISCLOSURE

The disclosure describes an array of resonant dipoles for redirecting a radio beam. The dipoles lie in one plane and are arranged parallel to the direction of polarization of the incident radio wave in equally spaced rows. When the row spacing, measured between dipole axes or dipole centers depending upon the incident wave polarization, is enough greater than $\lambda/2$ that the projection of this spacing on the direction of propagation of the incident wave is exactly equal to $\lambda/2$, phase coherence of the scattered energy occurs in four well defined directions and four radiation lobes of equal power result. These are the back scatter lobe directed toward the source of the incident wave, the forward scatter lobe 180° from the back scatter lobe, the reflection lobe having the same angle relative to the plane of the dipoles as the incident wave, and the bistatic scatter lobe 180° from the reflection lobe. The angle between the bistatic lobe and the dipole plane is therefore conjugate to that between the incident beam and the dipole plane, so that the angle between this lobe, which is the redirected beam of interest, and the incident beam is twice the angle between the incident beam and the dipole plane. By proper dipole spacing this angle may be set at any desired value. The array may be constructed on a light frame supporting parallel fibers of insulating material having a conductive coating at regular intervals to form the dipoles. Its simplicity and light weight together with the fact that, for directing radio waves over obstructions, the array may be mounted generally normal to the earth's surface rather than generally parallel thereto on a more complicated supporting structure as in the case of reflectors, give the array certain advantages, particularly in military applications, that offset the 6 decibel power loss that results from splitting the incident energy four ways.

---

The invention described herein may be manufactured and used by or for the United States Government for governmental purposes without the payment to us of any royalty thereon.

The purpose of this invention is to provide light-weight and simply erected means for redirecting radio waves so as to permit communication over or around obstructions. The light weight and ease of erection make the device particularly suited to military or other applications where the erection of conventional apparatus for this purpose, such as reflectors, would be too difficult and time consuming. A specific application to which the invention is well suited is in lowering the undesirably high horizon or a search radar installation surrounded by a protecting earthwork or other barricade.

Briefly, the invention comprises a resonant dipole array in which the dipoles are arranged in a single plane in equally spaced rows. If the rows have a spacing exceeding $\lambda/2$ and if a radio wave of wavelength $\lambda$, having a direction of polarization parallel to the dipole axes, impinges on this array at an angle of incidence relative to the dipole plane such that the projection of the dipole spacing on the direction of propagation of the incident wave is exactly equal to $\lambda/2$, the energy will be equally scattered by the array in four well defined directions. One of these directions, the one of interest here, makes an angle relative to the dipole plane that is conjugate to the angle of the incident wave relative to this plane. The energy scattered in this direction constitutes the desired redirected beam, the angle of which relative to the incident beam may be controlled by varying the dipole spacing.

Figure 1:
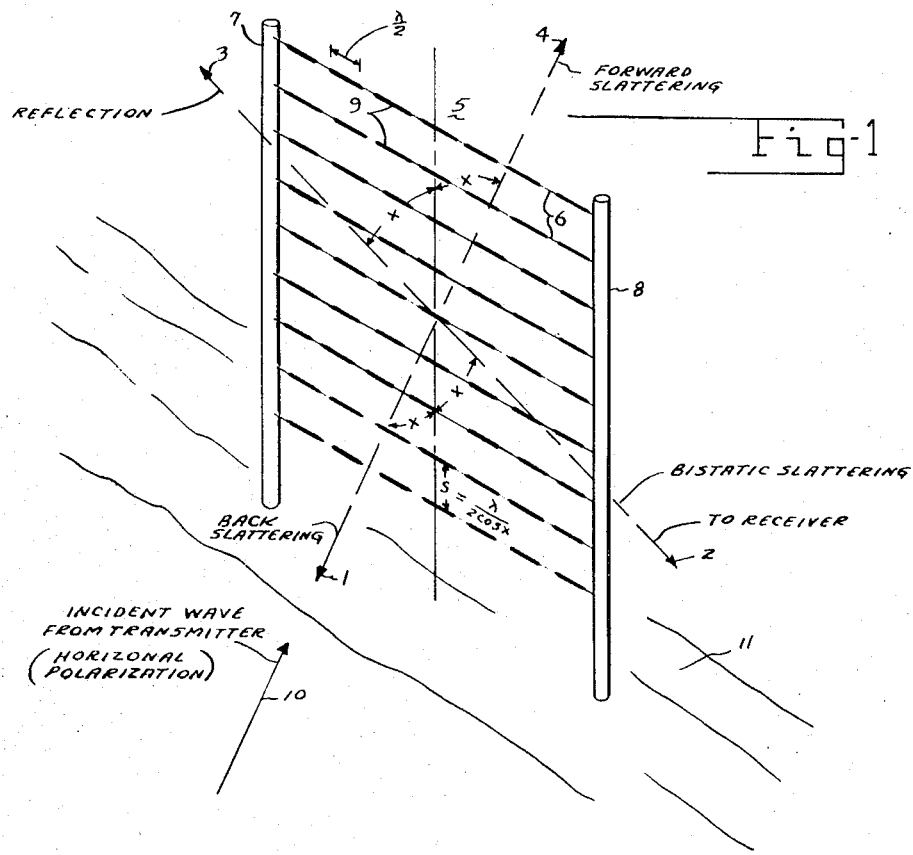
Figures 2, 3:
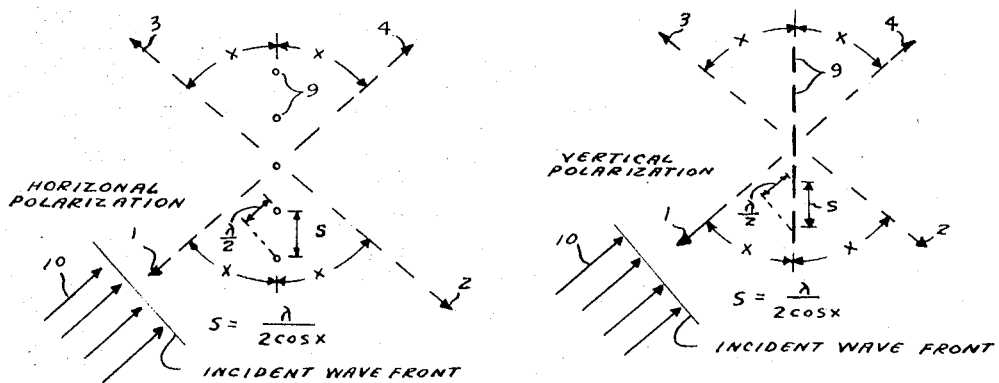
Figure 4:
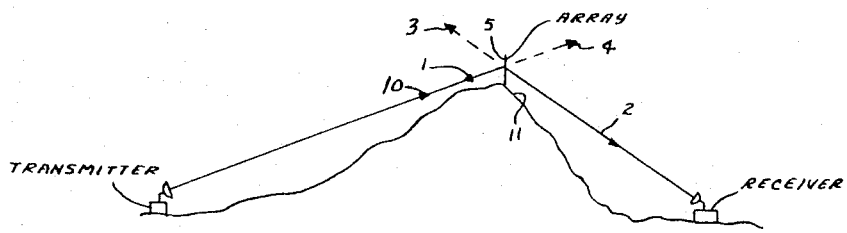
Figure 5:
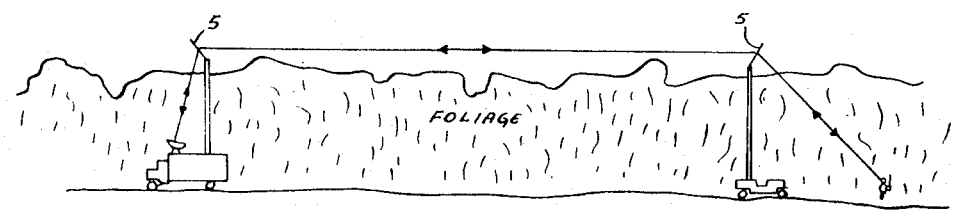
Figure 6:
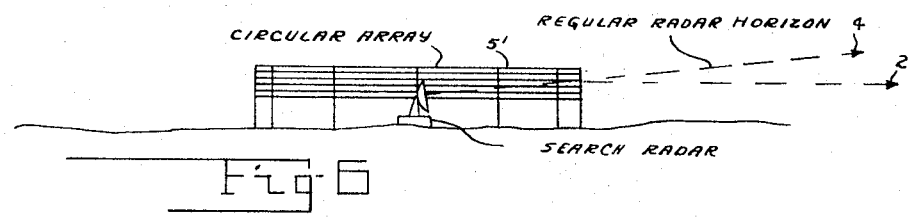
Figure 7:
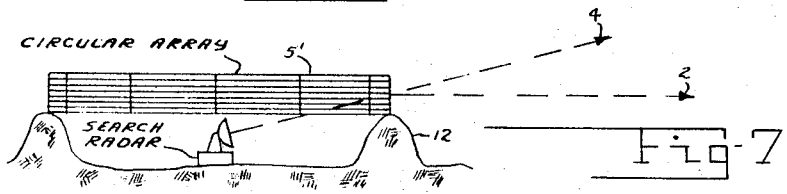
Figure 8:
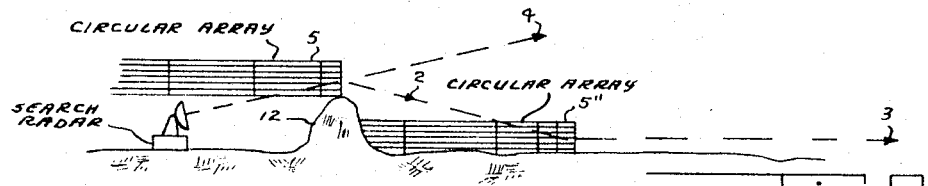
Figure 9:
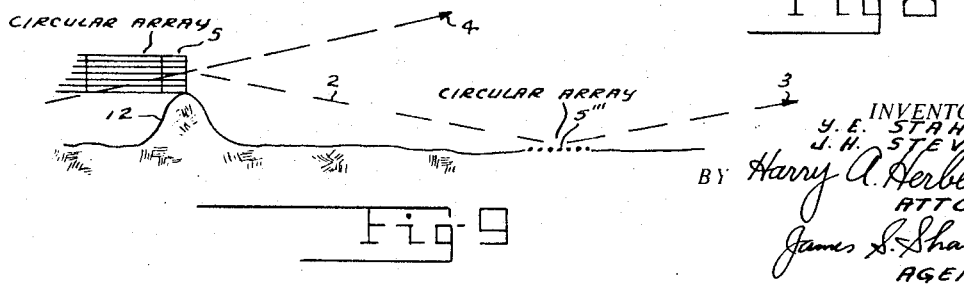

The invention will be described in greater detail with reference to the specific embodiments thereof shown in the acompanying drawings in which:

FIG. 1 shows the physical appearance of an array constructed in accordance with the invention, FIGS. 2 and 3 illustrate schematically the dipole spacing and the directions of the incident and scattered energies for horizontal and vertical polarizations of the incident wave, respectively, FIG. 4 illustrates use of the array for radio communication over an obstruction such as a mountain range, FIG. 5 illustrates use of the array for radio communication in an area of dense foilage, FIGS. 6 and 7 show how the array may be used to lower the horizon of a search radar, especially one surrounded by a protective barricade, and FIGS. 8 and 9 show methods, using the array, of providing nearby ground level surveillance for a barricaded search radar.

Referring to FIG. 1, the array 5 may be formed by fibers 6 of insulating material, strung at equal intervals between uprights 7 and 8, on which the dipoles 9 are formed by a metallic coating applied to the fibers at regular intervals. The dipoles have a length of $\lambda/2$, $\lambda$ being the wavelength of the incident radio wave. the direction of which is indicated by arrow 10. The array is shown in FIG. 1 as positioned at the crest of an obstruction 11, such as a mountain range, for redirecting the energy received from direction 10 over the obstruction and down the other side along direction 2, as illustrated to a smaller scale in FIG. 4.

The dipoles 9 of FIG. 1 are horizontally positioned, since the incident wave is horizontally polarized as indicated, and the plane of the dipoles is normal to a vertical plane parallel to the incident wave's direction. The dipoles are excited by the incoming wave, at the frequency of which they are resonant due to their $\lambda/2$ length, and as a result produce a secondary radiation or scattering of the incoming radio frequency energy. If the spacing $s$ between rows of dipoles exceeds $\lambda/2$ by such amount that the projection of this spacing on the direction 10 of the incident wave is exactly $\lambda/2$, as better seen in FIG. 2, phase coherence of the scattered energy takes place in four well defined directions or lobes. These are a back scatter direction 1 directed toward the source of the incident wave, a forward scatter direction 2 180° from direction 1, a reflection direction 3 at the same angle $x$ to the dipole plane as the incident wave, and a bistatic scatter direction 2 at an angle to the dipole plane that is conjugate to the angle $x$ of the incident wave and therefore equal to $x$. The incident power is divided equally between the four lobes.

The lobe in the direction 2 is the one of principal interest in this case and constitutes the redirected radio beam. As seen in FIGS. 1 and 2, it makes an angle $2x$ with the direction 10 of the incident wave. This angle may be set to any desired value by adjusting the row separation $s$ in accordance with the relationship $$s = \lambda/2 \cos x$$

If the incident wave is vertically rather than horizontally polarized, the dipoles are arranged vertically as shown in FIG. 3. In this case, the row spacing $s$ is measured between corresponding points in the dipoles such as their centers.

FIGS. 6–9 show additional uses of an array constructed in accordance with the invention. Due to its lightweight and simple construction, the array may be placed atop relatively light structures, erectable on vehicles for example, to improve communication by going above the foilage in dense jungle areas, as shown in FIG. 5. Where the regular horizon of a search radar is too high, as in FIG. 6, or where it is raised above its natural position by a protective earthwork or barricade 12, as in FIG. 7, circular array 5' constructed as in FIG. 1 or 3 and surrounding the antenna may be used to redirect one-fourth of the radiated energy at a lower elevation angle, thus lowering the effective horizon of the radar. Where very low level surveillance is desired, as for detecting surreptitious approach to the installation for example the direction 2 of the bistatic lobe may be depressed still further and a second circular array 5'' used to redirect this energy parallel to the earth's surface, as shown in FIG. 8. In a modification of FIG. 8, the outer array may be placed flat on the ground, as shown in FIG. 9. The array is still constructed on the same principle as that in FIG. 1 and operates in the same manner, however, in this case, the reflected energy in direction 3 is utilized.

We claim:

1. In a system for transmitting radio waves from a first point to a second point through a third point situated between said first and second points but not in alignment therewith, apparatus at said third point for redirecting the radio wave from said first point toward said second point, said apparatus comprising: an array of similar resonant dipoles lying in a plane surface that contains said third point, that is normal to the plane defined by said three points, and that bisects the angle defined by the lines joining said first and third points and said third and second points; said dipoles being parallel to the direction of polarization of said waves and being arranged in parallel equidistant rows normal to the plane defined by said three points; and the spacing between said rows being enough greater than a half wavelength that the projection of said spacing on the line between said first and third points exactly equals a half wavelength.

2. Apparatus as claimed in claim 1 in which the dipole length is a half wavelength.

3. Apparatus as claimed in claim 1 in which said first point is on the earth's surface and is the location of a search radar station scanning in azimuth; in which there are an infinite number of third points located on a horizontal circle concentric with said first point and a corresponding infinite number of second points located on a larger horizontal circle concentric with said first point; in which the surface containing said third points and said dipoles, instead of being a plane, is the surface of a cone having a vertical axis passing through said first point and having an apex angle of such value that the conical surface bisects the angle defined by a line from said first point to any third point and the line between said any third point to the corresponding second point; and in which said dipole rows are horizontal inches on said conical surface.

4. Apparatus as claimed in claim 3 in which the circle containing said second points is located near the earth's surface, and in addition there is a second resonant dipole array lying on the surface of a cone containing said second points, said cone having a vertical axis passing through said first point and having an apex angle of such value that the conical surface bisects the angle between the horizontal and a line from any third point to its corresponding second point, the dipoles of the second array being parallel to the direction of polarization of said waves and being arranged in parallel equidistant rows that are horizontal circles on the last mentioned conical surface, and the spacing of said rows being enough greater than a half wavelength that the projection in a vertical plane of said spacing on a line between a said third and corresponding second points exactly equals a half wavelength.

5. Apparatus as claimed in claim 3 in which the circle containing said second points lies on the earth's surface, and in addition there is a second resonant dipole array lying on the earth's surface and containing said second points, the dipoles of said second array being parallel to the direction of polarization of said waves and being arranged in parallel equidistant rows that are circles concentric with said first point, and the spacing of said rows being enough greater than a half wavelength that the projection in a vertical plane of said spacing on a line between a said third and corresponding second points exactly equals a half wavelength.

6. Apparatus as claimed in claim 1 in which said array is constructed of a plurality of parallel equally spaced taut fibers of inculating material lying in a single plane, said fibers having conducting coatings at regular intervals to form said dipoles.

References Cited

UNITED STATES PATENTS 3,144,606   8/1964   Adams et al. _____ 343—909

ELI LIEBERMAN, *Primary Examiner.*

M. NUSSBAUM, *Assistant Examiner.*

U.S. Cl. X.R.

343—909